United States Patent [19]

Hindle

[11] Patent Number: 4,773,665
[45] Date of Patent: Sep. 27, 1988

[54] MOTORCYCLE STAND

[76] Inventor: Langley F. Hindle, 110 Heale Avenue, Scarborough, Ontario, Canada, M1N 3Y1

[21] Appl. No.: 95,926

[22] Filed: Sep. 14, 1987

[51] Int. Cl.$^4$ .............. B25H 1/08; B62H 3/02; B62H 3/06; B62H 3/10
[52] U.S. Cl. ................. 280/293; 248/165; 254/8 R; 280/295; 403/192; 403/233; 403/403
[58] Field of Search ............. 280/293, 295, 302, 303; 254/8 R, 8 B, 94; 248/165, 352; 211/182; 403/233, 192, 205, 403

[56] References Cited

U.S. PATENT DOCUMENTS

| | | | |
|---|---|---|---|
| 1,467,908 | 9/1923 | Perringo | 280/302 |
| 2,414,903 | 1/1947 | Schultz | 280/301 |
| 2,522,801 | 9/1950 | Randrup | 254/88 |
| 2,791,441 | 5/1957 | Phillips | 280/302 |
| 3,462,021 | 8/1969 | Hawke et al. | 403/233 X |
| 3,521,860 | 7/1970 | Zehrung et al. | 254/8 R |
| 3,733,051 | 5/1973 | Bollinger | 254/94 |
| 4,324,384 | 4/1982 | Elser | 254/94 X |
| 4,580,804 | 4/1986 | Weber | 280/300 |

OTHER PUBLICATIONS

"Lockhart Kwik Lift", Cycle, Sep. 1987, pp. 40 and 41.
"Sporting Tires", Cycle, Aug. 1987, pp. 66 and 67.
"GTG Megastant", Motorcyclist, Sep. 1987, p. 23.

Primary Examiner—John A. Pekar
Attorney, Agent, or Firm—Ridout & Maybee

[57] ABSTRACT

This invention relates to a stand for a motorcycle. The stand comprises an elongate transverse frame member, which has a non-circular cross-section, a first pair of similar elongate leg members, and a second pair of similar elongate leg members. Each leg member of both pairs has a non-circular transverse socket at one end. The shape of the socket corresponds to the cross-sectional shape of the transverse frame member. The leg members are slid on the frame member and secured with the members of the first pair in a first plane at an acute or right angle to the members of the second pair in a second plane. A transverse member is mounted on each leg of the first pair for engagement with the undercarriage of the motorcycle. Alternatively, a channel member, which has a hole cut through each of its sides, the holes in register with one another, is slipped about each front fork of the motorcycle between the bottom crown and fork slider. A cross-bar is passed through the holes to secure each front fork within the channel member. Each end of the cross-bar is engaged by a transverse socket mounted near the distal end of each leg member of the second pair.

28 Claims, 5 Drawing Sheets

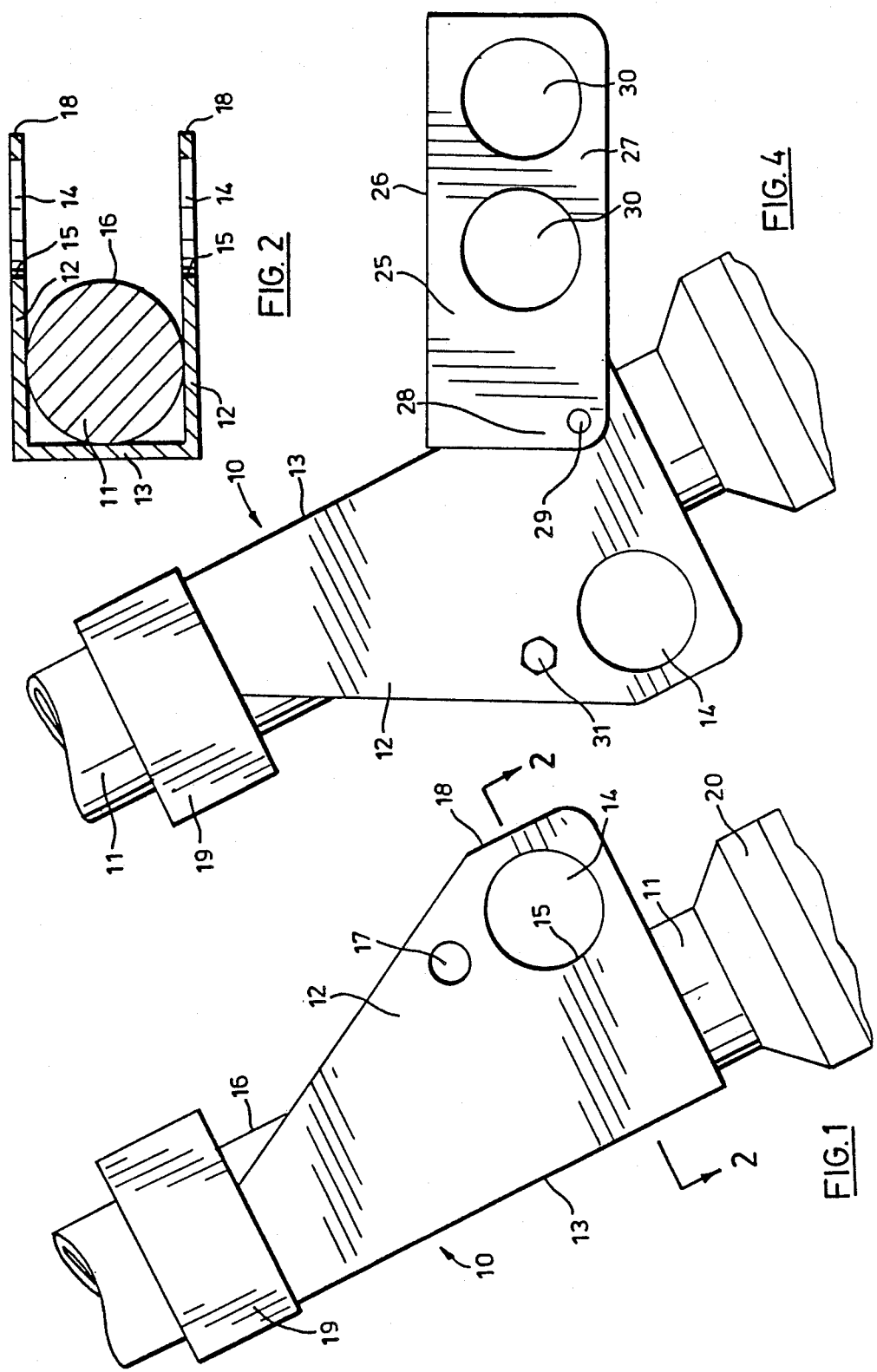

MOTORCYCLE STAND

This invention relates to a stand for a motorcycle, particularly a stand which stably supports the motorcycle enabling repair work to be undertaken.

The single leg stand attached to a motorcycle body, by the manufacturer, is normally adequate when the motorcycle is simply parked. However, this type of stand does not offer a sufficiently stable support if the front or rear wheel of the motorcycle is removed, for example, during repair work. Large motorcycle workshops often have large, complicated and expensive motorcycle stands for these applications. However, much repair work can be performed by the average motorcyclist, but the unavailability of a simple, lightweight and inexpensive stand is a drawback.

U.S. Pat. No. 1,467,908 discloses a portable stand which is pivotally attached to a motorcycle adjacent its rear axle. The stand comprises a double bent rod having foot and leg portions angled to one another. The motorcycle is rocked rearward about the bend between the foot and leg portions to raise the rear wheel of the motorcycle. When the stand is not in use, it is swung upward about its pivotal attachment to the motorcycle and fastened to the rear mudguard. However, the stand, being a permanent attachment, detracts from the aesthetic appeal of the motorcycle. U.S. Pat. No. 2,414,903 describes a similar stand attached to the outer side of each front fork of a bicycle.

U.S. Pat. No. 2,791,441 describes a U-shaped stand which is permanently attached to the guards of a motorcycle beneath its engine. The stand does not raise either of the wheels off the ground. U.S. Pat. No. 4,580,804 describes a stand comprising a pair of retractable leg assemblies having telescopically engaging members. Latching mechanisms are provided for releasably retaining the leg assemblies in either a retracted position or an extended position. In the extended position, the motorcycle may be raised by rocking it from side to side.

The prior art lacks a simple, yet effective, stand which may be releasably attached to a motorcycle, which may be readily disassembled and stored in a small, conveniently sized container, and which provides adequate support for the motorcycle.

In one aspect, the invention provides a stand for a motorcycle having a bottom crown and fork slider on each front fork of the motorcycle. The stand comprises a pair of channel section members each having two sides joined by a channel bottom, with each side having a hole through it adjacent the edge opposite the channel bottom, the holes in register with one another. The channel section member is proportioned to receive in it a portion of the front fork member of the motorcycle between the bottom crown and fork slider with an end of the channel section member engageable with the bottom crown. The stand includes means slidable through each hole of the channel section member to releasably secure a front fork of the motorcycle between it and the channel bottom; and a supporting structure engageable with the channel section member to support the motorcycle.

In a further aspect, the invention provides a stand for a motorcycle comprising a supporting structure including an elongate transverse frame member having a non-circular cross-section; a first pair of similar elongate leg members each having a non-circular, transverse socket at one end corresponding to the cross-sectional shape of the transverse frame member and slidable thereon for securing the leg members in a first plane, a second pair of similar elongate leg members each having a non-circular, transverse socket at one end corresponding to the cross-sectional shape of the transverse frame member and slidable thereon for securing the leg members of the second pair in a second plane at an right angle to the first plane; and motorcycle engaging means attachable to one pair of leg members for attaching the stand to a motorcycle.

Embodiments of the invention are described, by way of example only, with reference to the drawings in which:

FIG. 1 is a side view of a channel member fitted about a front fork of a motorcycle;

FIG. 2 is a cross-sectional view of the channel member of FIG. 1 taken along line 2—2;

Figure 3:
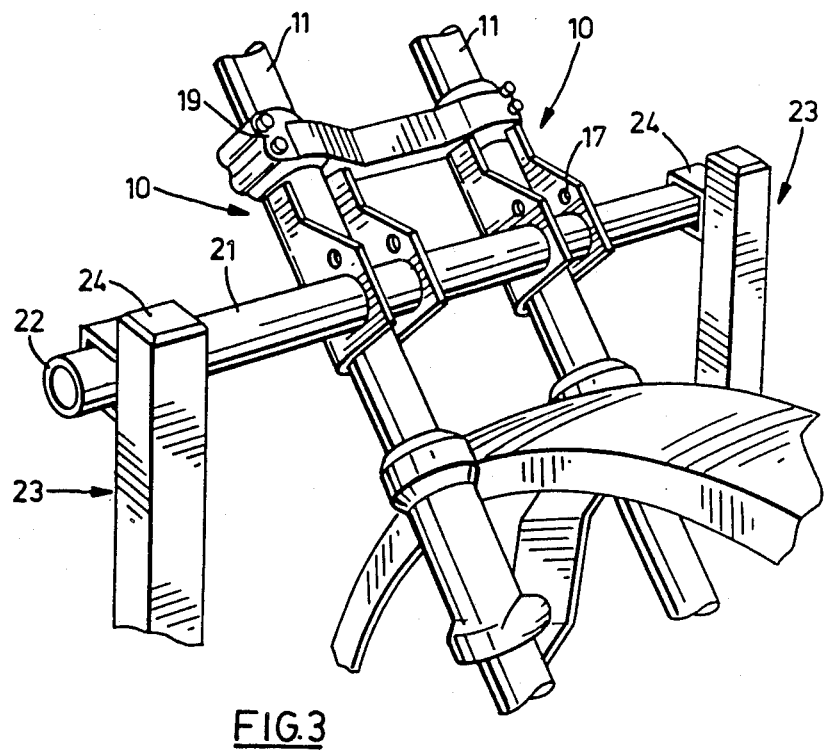
Figure 9:
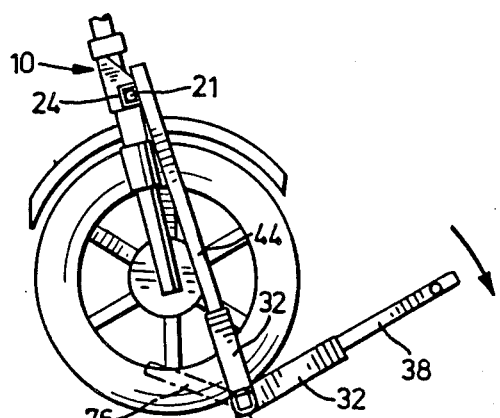
Figure 10:
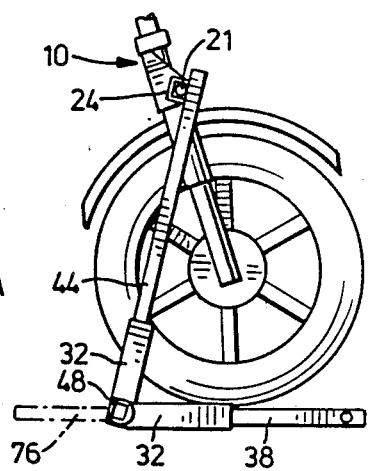
Figure 5:
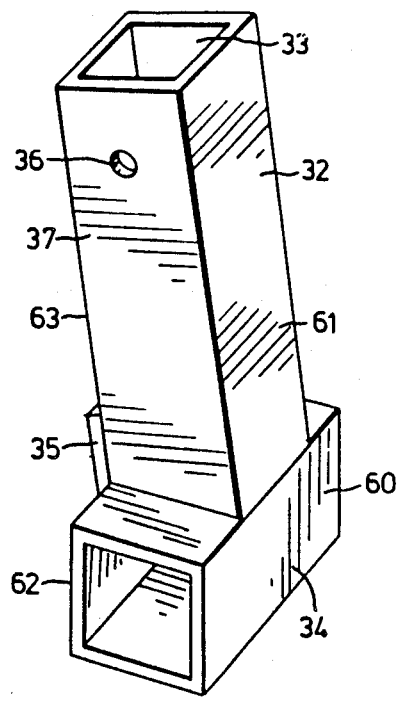
Figure 6:
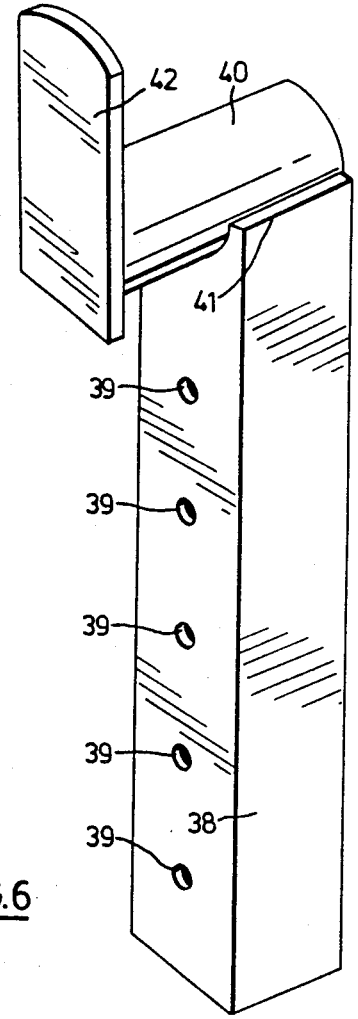
Figure 7:
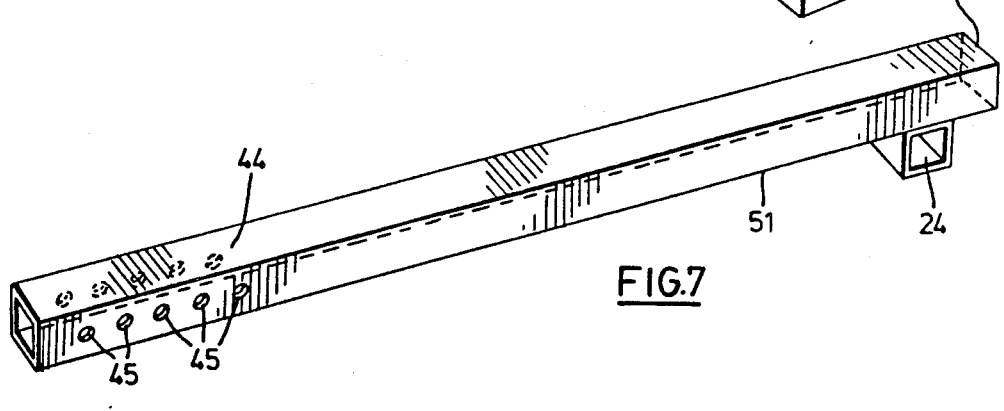
Figure 8:
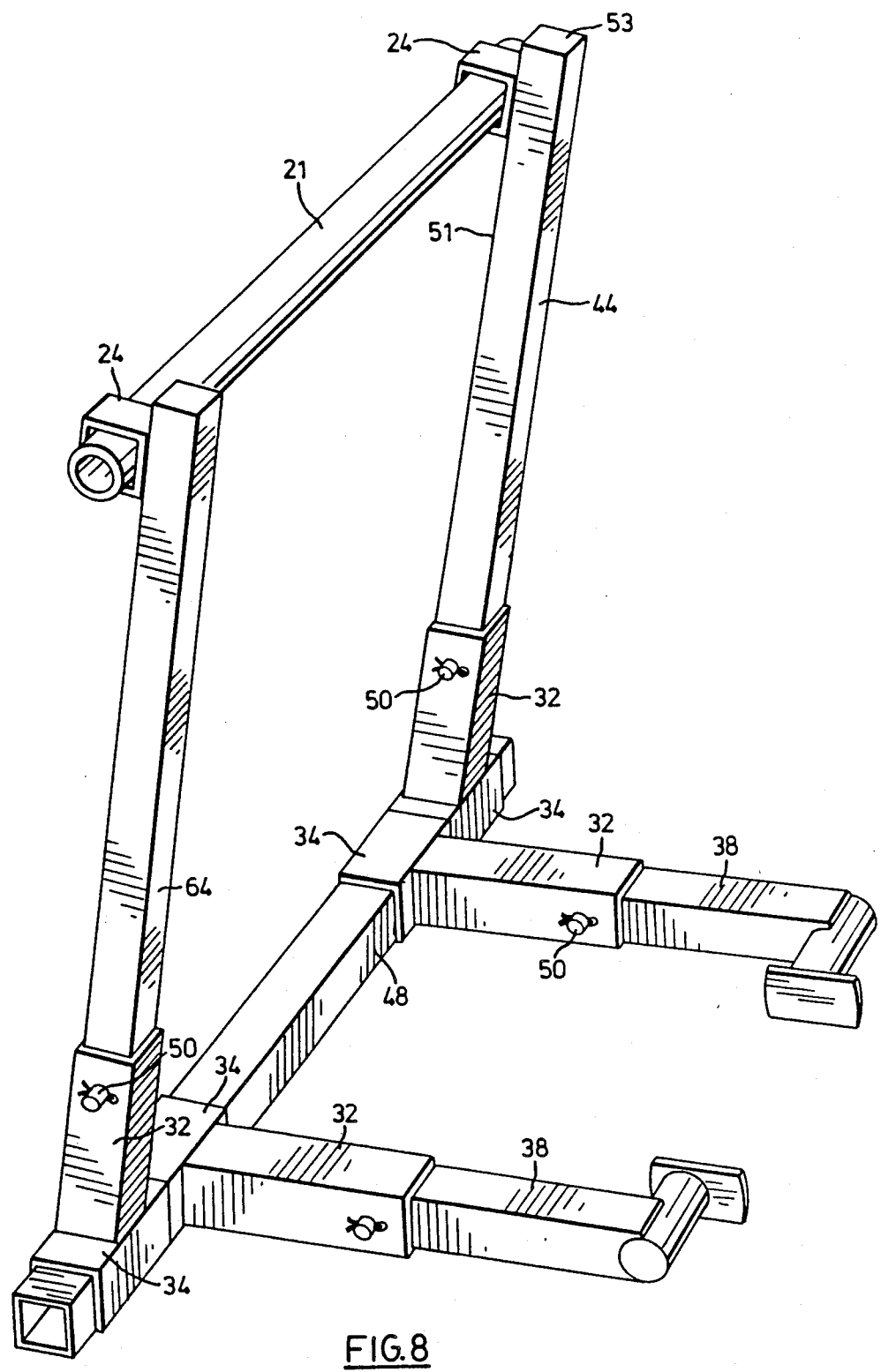
Figure 11:
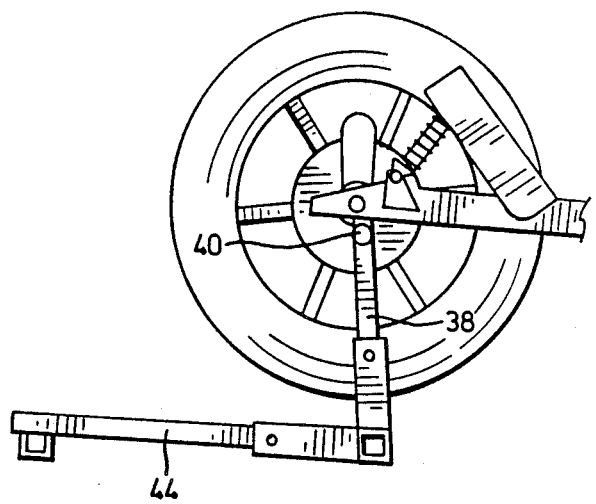
Figure 12:
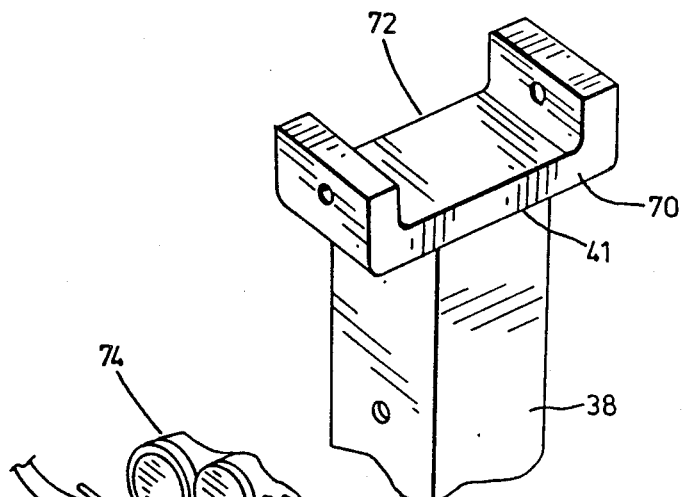

FIG. 3 (located on the same sheet as FIGS. 9 and 10) is a perspective view of two channel members of a stand releasably engaged to the front forks of a motorcycle;

FIG. 4 (located on the same sheet as FIGS. 1 and 2) is a side view of a further embodiment of a channel member fitted about a front fork of a motorcycle;

FIG. 5 is a perspective view of a joining member of a stand;

FIG. 6 is a perspective view of a leg member of a stand;

FIG. 7 is a perspective view of a further leg member of a stand;

FIG. 8 is a perspective view of an assembled stand;

FIG. 9 is a schematic view of a stand attached to a motorcycle before it is supported by the stand;

FIG. 10 is a schematic view of the stand of FIG. 9 supporting the motorcycle in a raised position;

FIG. 11 is a schematic view of a stand attached to and supporting a motorcycle adjacent its rear axle;

FIG. 12 is a perspective view of a further leg member of the stand; and

Figure 13:
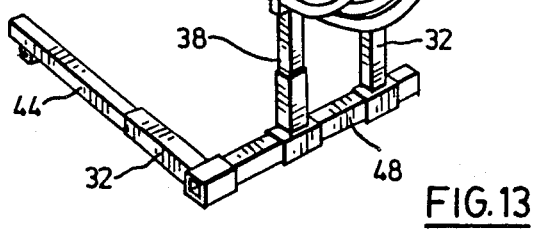

FIG. 13 is a perspective view of the stand supporting a motorcycle beneath its engine.

Referring to FIGS. 1 and 2, a channel section member generally indicated by the numeral 10, is shown fitted around a front fork 11 of a motorcycle. The channel section member 10 has two wing-like sides 12 joined by a channel bottom 13. A circular hole 14 is cut through each side 12 adjacent the outer edge 18 near the lower corner. The holes 14 are positioned in each side 12 to align with each other. The inner edge 15 of each hole 14 is preferably positioned beyond the forward extension 16 of the surface of the front fork 11. A smaller circular hole 17 is cut through each side 12 above the larger hole 14. In this embodiment the upper portion of the outer edge 18 is tapered inwardly toward the channel bottom 13. Preferably, the width of the channel bottom 13 is just larger than the outer diameter of the front fork 11. In use, the channel section member 10 is fitted about the front fork 11 beneath the bottom crown 19 and above the fork slider 20 with the upper edge of the channel section member 10 engaging the bottom crown 19 to support the motorcycle.

Referring to FIG. 3, a channel section member 10 is fitted about each front fork 11 of a motorcycle and a cylindrical cross-bar 21 is passed through the holes 14 of each channel section member 10. In this manner, the channel section members 10 are releasably held to the front forks 11. If necessary, a locking bolt (not shown) or the like may be passed through the smaller holes 17 of each member to provide a more secure engagement. Each end 22 of the cylindrical cross-bar 21 is engaged by a suitable supporting structure 23 to support the motorcycle in an upright position. Any suitable supporting structure may be used. For example, the stands disclosed in U.S. Pat. Nos. 1,467,908 and 2,414,903 may be provided with a suitable socket 24 on each of their upright portions, through which an end 22 of the cross-bar 21 may pass.

In a further embodiment illustrated in FIG. 4, the channel section member 10 is attached to a fork 11 with the channel opening to the rear of the motorcycle, i.e., in the reverse direction to that shown in FIG. 1, and has a further channel section member 25 extending outwardly from its bottom 13. An end of the bottom 26 of the further channel member 25 abuts the bottom 13 of the channel section member 10 so that the member 25 extends at an angle away from the bottom 13 of the member 10.

The sides 27 of the further channel section member 25 extend downwardly from its bottom 26 with one end 28 of each side 27 attached to a side 12 of the channel section member 10 by suitable welding or bolts 29. Circular holes 30 are cut through each side 27 of the further channel section member 25. A locking bolt 31 is passed through the smaller circular hole 17 of the channel member 10 to lock it to the front fork 11. This embodiment may be used on motorcycles having a fairing or the like which may suffer damage if the cross-bar 21 is held too close to it. The cross-bar 21 is passed through either set of aligned holes 30 in each member 25, and is thus held well forward of the fairing.

The channel section member 10 and the cross-bar 21 may be manufactured from any suitable, structurally sound material. Aluminium is preferred as it combines structural strength with lightness of mass.

The channel section member 10 and the cross-bar 21 provide a convenient and effective means of releasably attaching a motorcycle stand to the front forks 11 of a motorcycle. Once repairs or the like have been completed, the stand may be rapidly disengaged from the motorcycle. Clearly, however, the cylindrical cross-bar 21 may be substituted by any other suitable means for attaching the channel section member to a supporting structure. Also, as mentioned previously, a bolt may be used to releasably secure the front fork 11 within the channel section member 10.

Referring to FIGS. 5 to 8, a preferred supporting structure for the channel section member 10 and the cross-bar 21 is illustrated. The supporting structure comprises four tubular joining members 32 each having a square cross-sectioned axial bore 33 extending from one end. A square-sectioned sleeve 34 is transversely affixed at the other end of the joining member 32, and extends laterally outward from two of its opposing sides. The sleeve 34 may be welded to the end of the joining member 32 or the joining member 32 and sleeve 34 may be cast integrally. A reinforcing gusset 35 may be welded across the interface between the sleeve 34 and joining member 32 for additional bracing. One closed side face 60, of the two closed side faces, of the sleeve 34 meets its corresponding face 61 of the joining member 32 at an angle of 180° to 200° while the opposite closed face 62 of the sleeve 34 meets its adjacent face 63 of the joining member 32 at an angle of 160° to 180°. Preferably, the angles are 190° and 170° respectively. A correspondingly positioned hole 36 is provided through each of two opposing sides 37 of the joining members 32.

The supporting structure includes a first pair of square cross-sectioned elongate legs 38 which each fit telescopically within the bore 33 of a joining member 32. Each leg 38 has a plurality of holes 39 formed in aligned pairs, one of the pair of holes 39 on one side of the leg 38 and the other on an opposing side. When fitted within the bore 33 of a joining member 32, a pair of holes 39 can be aligned with the pair of holes 36 in the joining member 32. A gudgeon pin 50 or the like may be passed through the aligned holes 36 and 39 to secure the leg 38, in a particular extended position, to the joining member 32. A cylindrical bar 40 extends laterally from one side of the distal end 41 of the leg 38. A plate 42 is attached to the distal end of the cylindrical bar and aligned parallel to the leg 38. In a further embodiment shown in FIG. 12, a channel section support 70 is mounted on the distal end 41 of the leg 38 in place of the cylindrical bar 40. The channel opening 72 faces directly away from the distal end 41 of the leg 38.

The second pair of square cross-sectioned elongate legs 44 each fit telescopically within the bore 33 of a joining member 32. Each leg 44 has a plurality of holes 45 formed in aligned pairs, one of the pair of holes 45 on one side of the leg 44 and the other on the opposing side. When fitted within the bore 33 of a joining member 32, a pair of holes 45 can be aligned with the pair of holes 36 in the joining member 32. A gudgeon pin 50 or the like may be passed through the aligned holes 36 and 45 to secure the leg 44, in a particular extended position to the joining member 32. A socket 24 or the like is attached to a side 51 of the leg 44 which does not have holes 45. The site of attachment of the socket 24 to the leg 44 is near the end 53 which is remote from the holes 45. Preferably, the legs 44 of the second pair are longer than the legs 38 of the first pair.

The legs 38 and 44 have cross-sectional dimensions so as to fit slidably but not too loosely into the bore 33 of a joining member 32. The cross-sectional shape of the legs 38 and 44 and of the bore 33 of the joining member 32 may be any shape, but is preferably polygonal, and more preferably rectangular or square shaped.

Referring to FIG. 8, the supporting structure is assembled by providing a transverse frame member 48 and fitting it into the sleeve 34 of each of the four joining members 32. The inner two joining members 32 are aligned in a first plane at an angle to the outer two joining members 32 which are aligned in a second plane. The angle between the inner and outer joining members is an acute or right angle and is preferably in the region 70° to 90° and more preferably about 80°. The first pair of legs 38 are each fitted into the bore 33 of an inner joining member 32 while the second pair of legs 44 are each fitted into the bore 33 of an outer joining member 32. The legs 38 and 44 are telescoped to a chosen position and are each secured by a gudgeon pin 50 or the like. The first pair of legs 38 extend substantially horizontally along the surface on which the stand rests while the second pair of legs 44 are upstanding. A cylindrical cross-bar 21 is fitted through the socket 24 of each upstanding leg 44. The cross-member 21 carries two channel members 10 (not shown in FIG. 8) which are each attached to a front fork 11 of a motorcycle. The transverse frame member 48 may not rotate with respect to the joining members 32. Therefore, the sleeve 34 of each joining member 32 has a non-circular cross-section, preferably a polygonal cross section and, more preferably, a rectangular or square cross-section. The transverse frame member 48 is correspondingly shaped in cross-section. Alternatively, locking pins or the like may be provided to lock the sleeve 34 to the transverse frame member 48.

If additional support is required, a bracing member (not shown) may be connected between an adjacent inner and outer joining member 32. A hole is cut into the bracing member adjacent each end, and the gudgeon pin 50 securing a leg to a joining member is passed through the hole.

In an alternative arrangement, the transverse frame member 48 may be provided with a non-circular bore. A complementarily shaped non circular insert (not shown) is then inserted into the bore with its distal end projecting from the bore. The distal end of the insert is shaped to be received by an arm having a one-way ratchet connection to the insert, for example, a ratchet spanner. A square cross section or a hexagonal cross section shaped is preferred.

Clearly, it is not necessary that the legs 38 and 44 telescope within the joining members 32. The legs 38 and 44 may be each fixedly attached to a joining member 32 or may be integral with the joining member 32. These embodiments lack the flexibility of the embodiment in which the legs telescope within the stand.

The components of the supporting structure are preferably manufactured of aluminium as this material combines structural strength with a low mass.

In use, the supporting structure is assembled as shown in FIG. 8 but without the cross-bar 21 extending between upstanding legs 44. The supporting structure is then positioned about the front wheel of a motorcycle with the transverse frame member 48 being placed just in front of the front wheel. The upstanding legs 44 extend upwardly and forwardly, one on each side of the wheel. A channel section member 10 is slipped about each front fork 11 of the motorcycle just below each bottom crown 19. The stand is rocked back until the socket 24 on each upstanding leg 44 aligns with the holes 14 in the channel section members 10. The cross-bar 21 is slid through the aligned sockets 24 and holes 14 to releasably secure the channel section members 10 to the front forks 11 and to the supporting structure. In this position, the first pair of legs 38 are directed upwardly and forwardly while the second pair 44 are directed upwardly and rearwardly as illustrated in FIG. 9. The motorcycle is then rocked forwardly, pivoting about the transverse frame member 48, until the lower legs 38 engage the surface on which the stand rests. In this position, the front wheel of the motorcycle is raised from the surface and is supported by the stand. Also, the transverse frame member 48 is well rearward of the front axle of the motorcycle. When rocked forward, the front wheel travels through a "dead centre" point into a stably supported position. The position is illustrated in FIG. 10.

If the transverse frame member has been provided with an insert, a ratchet spanner 76 may be attached to its distal end. After the stand has been swung to raise the motorcycle, the ratchet spanner is locked in a position extending along the ground or the supporting surface on the opposite side of the transverse frame member to the first pair of legs. In this embodiment, it is not necessary for the angle between the first and second pair of leg members to be an acute or right angle.

The stand may be also used to support and raise the rear wheel or body of the motorcycle. In these applications, the second pair of legs 44 are positioned along the supporting surface while the first pair of legs 38 are upstanding. The cylindrical bar 40 or the channel section support 70 at the distal end of each leg 38 is positioned beneath the rear framework of the motorcycle adjacent the rear axle or beneath an engine guard-bar or the like. The motorcycle is then rocked rearwardly or forwardly as required to raise and support the motorcycle. The plate 42 at the distal end of the cylindrical bar 40 or the sides of the channel section support prevent the motorcycle from slipping off the stand. When used in this manner, the stand does not require the channel section members 10 or the cross-bar 21. The stand is shown attached to a motorcycle adjacent its rear axle in FIG. 11 and beneath the engine 74 of the motorcycle in FIG. 13. When it is attached beneath the engine, it is convenient to remove one of the legs of the second pair prior to fitting beneath the motorcycle. In this manner, the removed leg does not hinder a worker working on the engine or snag protruding parts of the motorcycle. The motorcycle is adequately supported despite the use of only one leg 44.

The stand also may be used to balance wheels. A wheel removed from the motorcycle may be mounted on an end 22 of the cross-bar 21 or an extension thereto (not shown) specially adapted for the purpose. Also, the wheel may be positioned on the crossbar 21 between the legs 44 of the second pair. The wheel then may be spun on the cross-bar 21 or extension in order to balance the wheel.

After use, the stand may be readily disassembled and stored in a convenient container.

Clearly, numerous variations may be made to the embodiments without departing from the scope of the invention as defined in the claims. For example, the channel section members 10 may be provided with projecting members extending laterally outward from each side 12. The projecting members may be engageable with a socket 24 or the like of a supporting structure 22. In this embodiment, the channel section member is secured to a front fork of a motorcycle by passing a bolt or the like through either set of holes 14 or 17 in the sides of the channel section member 10. The stand also may be used to support three or four wheeled vehicles such as all terrain vehicles (ATV's).

I claim:

1. A stand for a motorcycle having a bottom crown and fork slider on each front fork of the motorcycle, comprising:
    a pair of channel section members each having two sides joined by a channel bottom, each side having a hole through it adjacent the edge opposite the channel bottom, the holes in register with one another, the channel section member proportioned to receive a portion of the front fork member of the motorcycle between the bottom crown and fork slider, and an end of the channel section member engageable with the bottom crown;
    locking means slidable through each hole of a channel section member to releasably secure a front fork of the motorcycle between it and the channel bottom; and
    a supporting structure engageable with the channel section member to support the motorcycle.

2. A stand according to claim 1 in which the locking means slidable through each hole of a channel section member to releasably secure the front fork of the motorcycle between it and the channel bottom is a cylindrical cross-bar.

3. A stand according to claim 2 in which a cylindrical cross-bar passes through the holes of each channel member of the pair.

4. A stand according to claim 3 in which the supporting structure engages the ends of the cylindrical cross-bar.

5. A stand according to claim 1 further comprising a supporting member projecting outwardly from the outer surface of the channel bottom, parallel to the sides of the channel section member, and having a hole through it adjacent its distal end.

6. A stand according to claim 5 in which the supporting member is a further channel section member having a hole cut through each of its sides, the holes in register with one another, and having an end edge of its bottom engaging the bottom of the channel section member.

7. A stand according to claim 1, in which the supporting structure comprises an elongate transverse frame member having a non-circular cross-section; a first pair of similar elongate leg members each having a non-circular, transverse sleeve at one end corresponding to the cross-sectional shape of the transverse frame member and slidable thereon for securing the leg members in a first plane; and a second pair of similar elongate leg members each having a non-circular, transverse sleeve at one end corresponding to the cross-sectional shape of the transverse frame member and slidable thereon for securing the leg members of the second pair in a second plane at an angle to the first plane.

8. A stand according to claim 7 in which the elongate leg members of the first and second pairs each comprise a tubular, joining member having a non-circular, transverse sleeve at one end corresponding to the cross-sectional shape of the transverse frame member and an axial bore extending from the other end; and an elongate leg telescopically slidable within the axial bore of the joining member.

9. A stand according to claim 8 in which the cross-section of the elongate transverse frame member and the sleeve of each joining member is rectangular.

10. A stand according to claim 7 in which the cross-section of the elongate transverse frame member and the sleeve of each leg member is rectangular.

11. A stand according to claim 7 in which the angle between the first and second planes is an acute angle of 70° to 90°.

12. A stand according to claim 11 in which the acute angle between the first and second planes is 80°.

13. A stand according to claim 7 in which an arm is connected though a ratchet to the transverse frame member and locked to extend in the plane of one of the two pairs of legs on the other side of the transverse frame member and aligned along the surface on which the stand is supported.

14. A stand according to claim 7 in which each elongate leg member of the first pair has, at its distal end, a transverse cylindrical member.

15. A stand according to claim 14 in which the cylindrical member has a plate member attached to its distal end and aligned parallel to the elongate leg member.

16. A stand according to claim 7 in which each elongate leg member of the first pair has a channel section support mounted on its distal end.

17. A stand according to claim 7 in which each elongate leg member of the second pair has a transverse socket attached to it near its distal end.

18. A stand for a motorcycle comprising:
an elongate transverse frame member having a non-circular cross-section;
a first pair of similar elongate leg members each having a non-circular, transverse sleeve at one end corresponding to the cross-sectional shape of the transverse frame member and slidable thereon for securing the leg members in a first plane;
a second pair of similar elongate leg members each having a non-circular, transverse sleeve at one end corresponding to the cross-sectional shape of the transverse frame member and slidable thereon for securing the leg members of the second pair in a second plane at an angle to the first plane; and
motorcycle engaging means attachable to one pair of leg members for attaching the stand to a motorcycle.

19. A stand according to claim 18 in which the elongate leg members of the first and second pairs each comprise an elongate, tubular joining member having a non-circular, transverse sleeve at one end corresponding to the cross-sectional shape of the transverse frame member and an axial bore extending from the other end; and an elongate leg telescopically slidable within the axial bore of the joining member.

20. A stand according to claim 19 in which the cross-sectional shape of the elongate transverse frame member and the sleeve of each joining member is rectangular.

21. A stand according to claim 18 in which the cross-sectional shape of the elongate transverse frame member and the sleeve of each leg member is rectangular.

22. A stand according to claim 18 in which the angle between the first and second planes is an acute angle of 70° to 90°.

23. A stand according to claim 22 in which the acute angle between the first and second planes is 80°.

24. A stand according to claim 18 in which an arm is connected through a ratchet to the transverse frame member and locked to extend in the plane of one of the two pairs of legs on the other side of the transverse frame member and aligned along the surface on which the stand is supported.

25. A stand according to claim 18 in which the motorcycle engaging means comprises a cylindrical member attached transversely to the distal end of each elongate leg member of the first pair.

26. A stand according to claim 25 in which the cylindrical member has a plate member attached to its distal end, the plate aligned parallel to the elongate leg member.

27. A stand according to claim 18 in which each elongate leg member of the first pair has a channel support mounted on its distal end.

28. A stand according to claim 18 in which the motorcycle engaging means comprises a transverse socket attached to each elongate leg member of the second pair near its distal end.

* * * * *